United States Patent [19]

Charon et al.

[11] 4,115,917
[45] Sep. 26, 1978

[54] METHOD FOR MAKING AN ELECTRICALLY CONDUCTIVE PAPER

[75] Inventors: Clarence W. Charon, Newark, Ohio; Laurent C. Renaud, Pittsfield, Mass.

[73] Assignee: Owens-Corning Fiberglas Corporation, Toledo, Ohio

[21] Appl. No.: 589,304

[22] Filed: Jun. 23, 1975

[51] Int. Cl.² .............................................. H05B 3/00
[52] U.S. Cl. ........................................ 29/611; 29/621; 156/291; 219/213; 219/549; 219/552; 338/212
[58] Field of Search ............... 219/212, 213, 345, 528, 219/529, 543, 545, 549, 552, 553; 428/414, 418; 52/171; 29/610 R, 611, 621; 338/210, 211, 212; 156/291; 204/2

[56] References Cited

U.S. PATENT DOCUMENTS

| | | | |
|---|---|---|---|
| 1,872,581 | 8/1932 | Haroldson | 338/211 |
| 2,314,766 | 3/1943 | Bull et al. | 219/213 |
| 2,559,077 | 7/1951 | Johnson et al. | 219/543 |
| 3,367,851 | 2/1968 | Filreis et al. | 204/2 |
| 3,473,003 | 10/1969 | Eisler | 219/213 |
| 3,598,961 | 8/1971 | Hager, Jr. | 219/552 X |
| 3,627,981 | 12/1971 | Kuhn | 219/212 |
| 3,757,087 | 9/1973 | Bernard | 219/549 X |
| 3,876,968 | 4/1975 | Barnes et al. | 338/211 |
| 3,923,581 | 12/1975 | Payne et al. | 156/291 |
| 3,935,422 | 1/1976 | Barnes et al. | 219/213 |
| 3,973,103 | 8/1976 | Tadewald | 219/543 |

Primary Examiner—Volodymyr Y. Mayewsky
Attorney, Agent, or Firm—John W. Overman; Philip R. Cloutier; Dennis M. Kozak

[57] ABSTRACT

An electrically conductive paper comprising glass fibers is made by dispersing electrically conductive materials i.e. electrically conductive fibers or particles, with the glass fibers of a paper-making slurry. Paper having an electrically conductive layer and a nonconducting layer can be made. Heating panels are made by adhering the electrically conductive paper to a wall in much the same manner as is wallpaper. A positive electrical terminal is applied to one end of the paper and a ground terminal is applied to the other end of the paper. A flow of electricity through the paper causes the paper to heat and to in turn supply heat to the room which the wall faces.

1 Claim, 7 Drawing Figures

U.S. Patent Sept. 26, 1978 Sheet 2 of 2 4,115,917
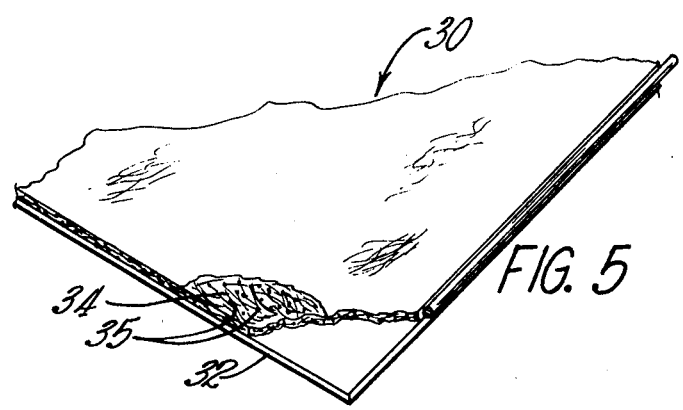
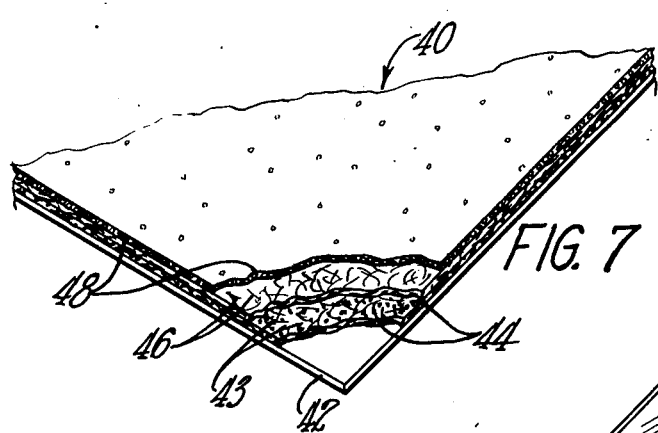
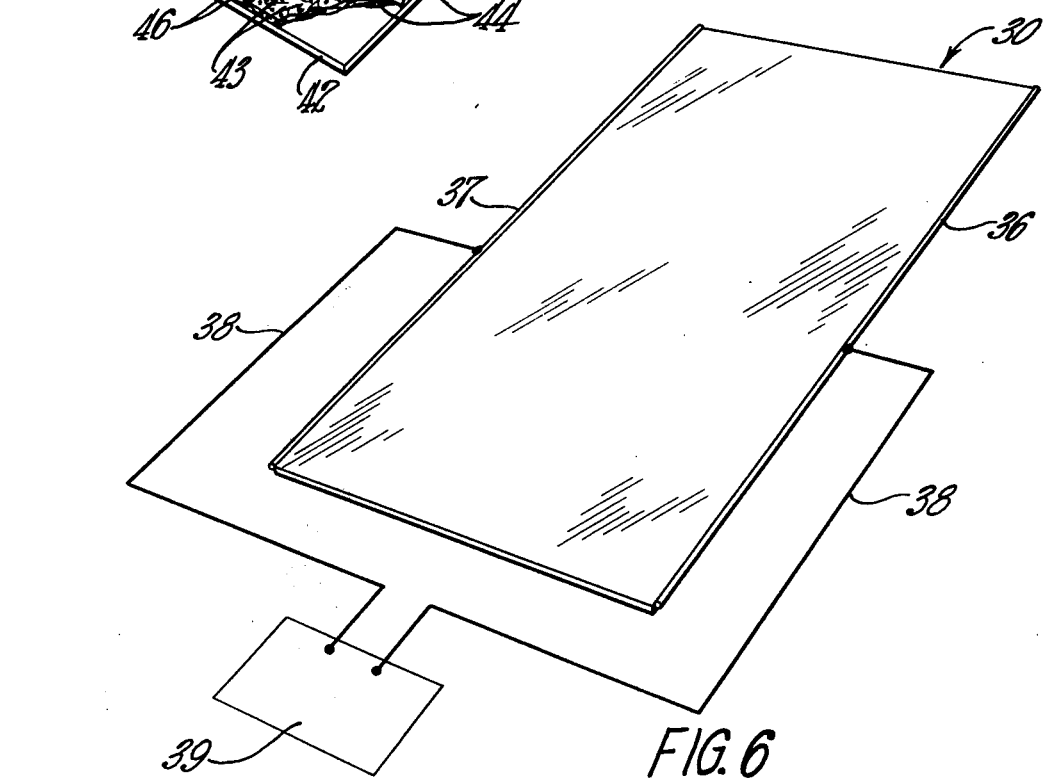

METHOD FOR MAKING AN ELECTRICALLY CONDUCTIVE PAPER

This invention relates to an electrically conductive paper made of glass fibers, to a method of making the paper and to heating panels made from the paper.

An object of this invention is to provide a new and improved noncombustible paper which is electrically conductive.

Another object of this invention is to provide an inexpensive heating panel for buildings and the like.

A further object of the invention is to provide a new and improved method of producing inexpensive electrically conductive sheet materials.

Further objects and advantages of the invention will become apparent to those skilled in the art to which the invention relates from the following description.

It has been discovered that aqueous suspensions of electrically conductive particles can be mixed with and dispersed throughout liquid dispersions of glass fibers, and the slurry drained through paper-making apparatus to produce a paper of the glass fibers. Not only is the paper electrically conductive, but the paper can be made into a heating element by regulating the current density passed therethrough, or by increasing the resistance of the paper when the paper is to be used for passing a particular current density. Any slurriable electrically conductive material can be co-deposited with the fibers to make an electrically conductive paper, and the particles can be of substantially any size and configuration. Suitable papers have been made from suspensions of generally spherical materials and from generally plate-like materials, preferred papers being made using electrically conductive fibers, including electrically conductive metals and carbon. The electrically conductive materials can be in the form of solid particles, or they can be in the form of coatings over other inorganic materials. Metallic coated glass fibers are a preferred electrically conductive material for many applications. Such coated fibers will include copper-coated glass fibers, and aluminum-coated glass fibers, both of which are relatively inexpensive.

Accordingly, there is provided by this invention an electrically conductive paper comprising generally planar, randomly oriented glass fibers having electrically conductive particulate matter dispersed throughout said fibers, the electrically conductive matter being supported in random electric contact by the fibers. This invention provides such paper in the form of a felt and a heating panel.

The paper of the present invention can be made electrically conductive using any type of electrically conductive material fine enough to be dispersed throughout the slurry of the glass fibers. While carbon is a preferred material, particles of any electrically conductive metal can be used as, for example, copper, stainless steel, carbon steel, aluminum, silver, and the like and the choice thereof will depend principally on economics and the atmosphere to which the paper is to be subjected. Aluminum fibers and copper fibers of less than approximately 0.001 inch in diameter are desirable, as are glass fibers which are provided with an exterior coating of aluminum or copper. The latter expediency reduces the amount of expensive metals which must be used, and it distributes the heating material over a greater surface than would otherwise be possible with solid metal fibers.

The heating panel of the present invention can be put on the ceiling or on the floor beneath carpeting, since the paper is durable, generally non-matting, and can be walked upon. In those instances where a plastisol layer is not provided, an electrical connection to the power leads can be made by placing electrically conductive means against the electrically conductive surface of the paper and by folding the paper to encase the electrically conductive means with the conductive fibers of the paper. Moldings, such as ceiling moldings and mop boards, can be used to clamp the folded portions in place.

Any size and length of glass fibers which can be dispersed in water can be used to produce the paper, and suitable fibers will include beta-alpha-C, D, and E diameters. Halogenated plastisols are preferred surfacing materials where fire retardancy is important.

The amount of electrically conductive materials that is used will usually comprise from about 5 to about 40% of the total weight of the glass fibers and the electrically conductive material. In the use of collodial graphite, a mimimum of about 8 percent of the total weight of glass fibers and collodial graphite should be collodial graphite inorder to maintain satisfactory electrical conductivity.

While binder materials are not necessary, they can be used to increase the tear strength of the sheet, and any suitable polymer material can be used as a binder. Acrylic resins are another preferred material, and emulsions of polyethylenes, polypropylenes, polyurethanes, phenolics, etc. can be added to the paper-making slurries for this purpose. Nothing critical is encountered in the amount of the bonding agent which is used, and the increase in tear strength achieved will usually be in proportion to the amount of the bonding agent which is used. Generally binder solids from 2% to 10% of the total weight of fibers is to be preferred.

The invention is demonstrated by the following examples.

The following drawings illustrate the subject invention.

FIGS. 2, 3, 4, 5 and 7 are sectional views of various embodiments of FIG. 1;

FIG. 6 depicts the sheet of FIG. 1 adapted with conductors.

Figure 1:
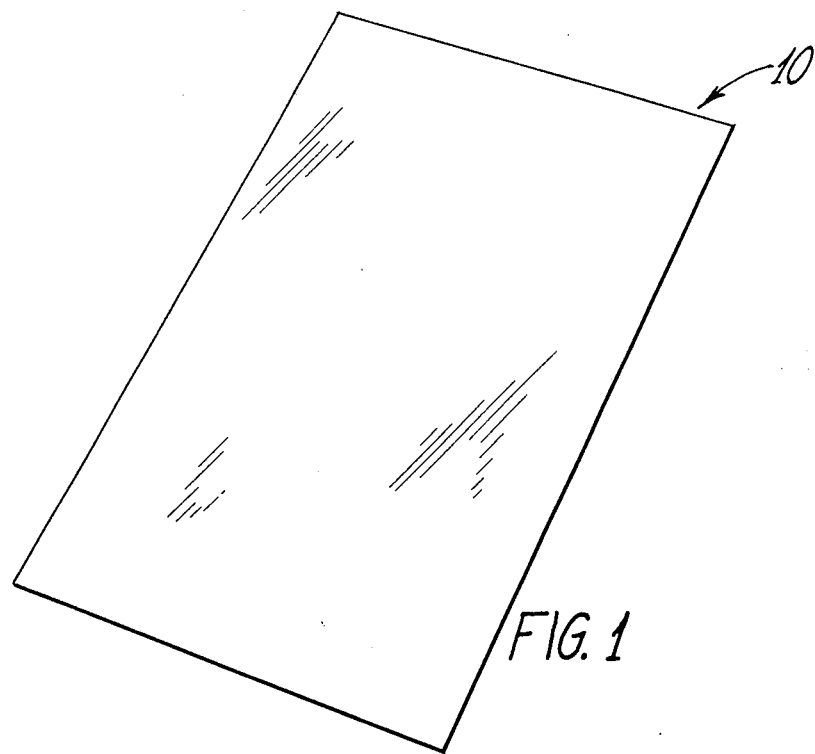
FIG. 1 is a planular view of a sheet of conductive paper.
Figure 2:
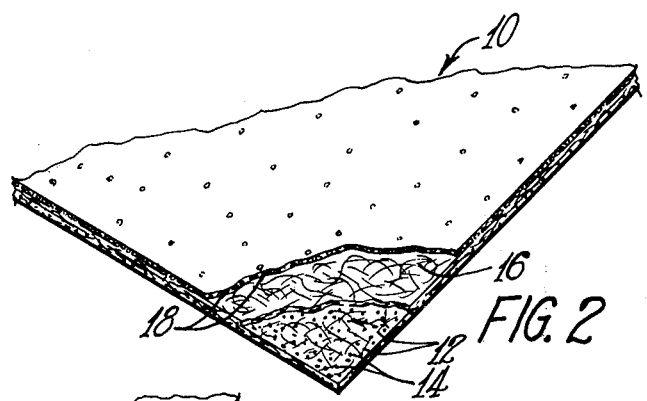

Referring now to FIG. 2, there is shown sheet 10 comprised of a layer of open-cell foamed plastisol 18 on the surface, supported by randomly disposed fibers 16, superimposed on electrically conductive particulate matter 14, which particles can also be non-fibrous, entrapped by glass fibers 12.

Figure 3:
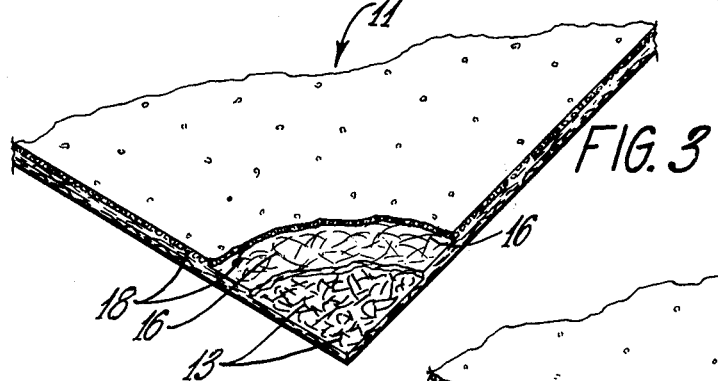

FIG. 3 represents the construction of FIG. 2 in which sheet 11 is comprised of open-cell foamed plastisol 18, randomly disposed fibers 16 and glass fibers 12 having an electrical coating 13 thereon.

Figure 4:
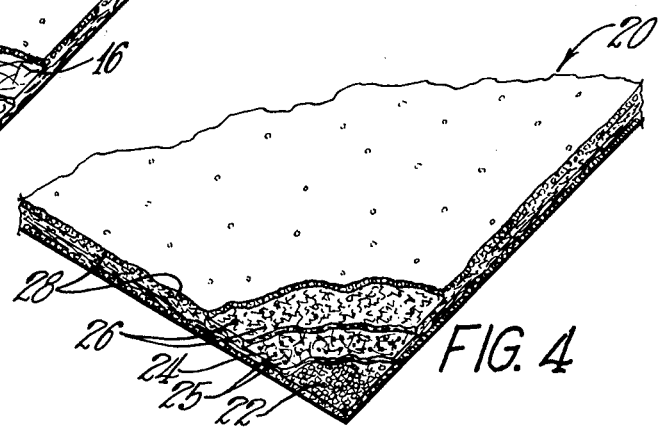

FIG. 4 represents a sheet 20 having upper surface 28 and bottom surface 22 of open-cell foamed plastisol, an upper portion 26 of non-conductive oriented glass fibers, and electrically conductive particulate matter 25 dispersed throughout randomly oriented glass fibers 24.

FIG. 5 represents the sheet 30 of FIG. 6 comprised of a lower support 32 having glass fibers 34 and electrically conductive particulate matter 35 disposed throughout.

FIG. 6 depicts a panel 30 as described in relation to FIG. 5 adapted with first conductor 36, second conductor 37 and means 38 for connecting the conductors to potentials of a power source 39.

FIG. 7 depicts the paper 40 as described in FIG. 2, positioned on panel 42, panel 42 having superimposed thereon generally planar randomly oriented glass fibers 43 having electrically particulate conductive matter 44 dispersed throughout and having an upper portion of non-conductive planar randomly oriented glass fibers 46 covered by a coating of open-celled plastisol 48. Panel 42 can also be of formed plastisol.

EXAMPLE I

An electrically conductive paper was made by charging 44 pounds of tap water into a mixing vessel. Thereafter, 15 grams of sodium hexametaphosphate were added to the water and stirred until completely dissolved. Sulphuric acid was then added to the solution to lower the pH to about 2.5. Thereafter, 30 grams of hydrous alumina silicate clay, and 100 grams of ¼ inch long beta diameter E-glass fibers were added with vigorous stirring with a Lightening Mixer for approximately 10 minutes to obtain a complete dispersion of the glass fibers. The pH of the slurry was then raised to 6.5 by the addition of sodium hydroxide. Thereafter, 80 grams of ¼ inch long carbon fibers having a diameter of 0.0003 inch were added and mixed for an additional 5 minutes to obtain a completely uniform distribution of the carbon fibers throughout the glass fibers. While not necessary in all instances, 4 grams of polyvinyl alcohol fibers were added as a binder forming material. Immediately after dispersion of the polyvinyl alcohol fibers, the slurry was dumped into a 12-inch square William's Sheet Mold. The water of the slurry was drained through the screen. The deposited fibers were removed from the screen in the form of a paper which was then dried in an air-drying oven for 3 min. at 350° F. The polyvinyl alcohol fibers were fused during the drying operation to form a binder for increasing the bond strength between the fibers.

The paper so produced was 40 mils thick. A sample 6 inches by 9 inches was cut from the 12-inch square sheet originally formed, and a pair of electrodes 9 inches wide were clamped to the sample at a distance of 6 inches apart. A 12-volt alternating current was applied to the electrodes and the amount of current through the sample was determined to be 2 amperes. The room temperature was 70° F. and the paper became heated to a temperature of 220° F. The resistance of the sample was determined to be 9 ohms. Data for this sample are given below as Sample A.

The process above was repeated with varying amounts of carbon fibers to produce Samples B-H, the properties of which are given in Table I.

TABLE I

| Sample | Paper Composition Weight Percent | | Temperature, ° F | Ohms | Mhos |
| | Glass Fibers | Carbon Fibers | | | |
|---|---|---|---|---|---|
| A | 55 | 45 | 220 | 9 | .1111 |
| B | 65 | 35 | 220 | 8 | .1333 |
| C | 70 | 30 | 200 | 15 | .0666 |
| D | 75 | 25 | 180 | 16 | .0625 |
| E | 80 | 20 | 180 | 14 | .0714 |
| F | 87 | 13 | 120 | 36 | .0277 |
| G | 89 | 11 | 120 | 62 | .0161 |
| H | 92 | 8 | 110 | 188 | .0053 |
| L | 73 | 27 | 180 | 15 | .0666 |

EXAMPLE II

The process of Example I was repeated excepting that glass fibers having a diameter between 0.0002 and 0.00025 inch were used with only 37 grams of carbon fibers. The properties of the resulting paper are shown as Example L in Table I.

EXAMPLE III

A paper was made using the procedure of Example I excepting that no carbon fibers were added. The dried paper was saturated with a colloidal carbon dispersion sold under the trade name "Aquadag", and the saturated paper was dried in an oven for ½ hour. "Aquadag" is sold by the Acheson Colloids Company and contains 50% solids. The dry paper before saturation weighed 5.678 grams and after saturating with the colloidal carbon weighed 6.205 grams. This paper was tested in the same manner as in Example 1, and had the properties given for Sample A in Table II below.

EXAMPLE IV

The process of Example III was repeated to produce papers containing various amounts of "Aquadag". These papers had the properties of Examples B-J in Table II. All papers were forty mils thick.

TABLE II

| Sample | Paper Weight, g. | | | Resistance, ohms | Conductivity, mhos | Temp. 20 F |
| | Dry | Final | Wgt. % | | | |
|---|---|---|---|---|---|---|
| A | 5.678 | 6.205 | 8.6 | 2380 | .4201 | 74 |
| B | 5.971 | 7.150 | 16.5 | 210 | .4761 | 85 |
| C | 5.880 | 7.411 | 20.6 | 146 | 6.8493 | 84 |
| D | 5.512 | 7.580 | 27.1 | 90 | 11.1111 | 100 |
| E | 5.682 | 8.287 | 31.4 | 52 | 19.2307 | 122 |
| F | 6.008 | 9.863 | 39.0 | 30 | 33.3333 | 145 |
| G | 5.947 | 10.01 | 40.5 | 34 | 29.4117 | 130 |
| H | 5.907 | 10.65 | 44.5 | 18 | 55.5555 | 150 |
| I | 5.862 | 10.79 | 45.6 | 20 | 50.0000 | 132 |
| J | 5.725 | 10.45 | 45.2 | 20 | 50.0000 | 148 |

EXAMPLE V

A glass fiber felted paper having electrically conductive carbon fibers in one portion thereof is made on a Rotoformer paper-making machine having a double felting press. Any paper-making machine having a stock box with multiple ponds can be used. A dispersion of glass fibers is made by charging 2400 gallons of water into a mixing chest and therein dissolving 15 pounds of sodium hexametaphosphate. Sulphuric acid is then added to the chest to lower the pH to 2.5. Thereafter, 30 pounds of hydrous aluminum silica clay and 100 pounds of ¼ inch chopped beta, sized, E-glass fibers are added and dispersed therein by mixing with a Lightening Mixer for approximately 20 minutes. Thereafter, the pH of the slurry is raised to approximately 4.5 by the addition of sodium hydroxide and 5 pounds of polyvinyl alcohol fibers are added and dispersed throughout the slurry to act as a bonding agent. This slurry is then fed to the lower stock pond of the Rotoformer paper-making machine.

A second slurry is made using the same procedure as given above excepting that 50 pounds of carbon fibers having a diameter of 0.0001 inch and a length of approximately ¼ inch are added to the slurry prior to the adjustment of the pH to 6.5 with sodium hydroxide. This slurry is added to the top stock pond of the Rotoformer paper-making machine. The Rotoformer machine is then operated in the normal manner to produce a paper 70 mils thick, the upper approximately 35 mils of which is electrically conductive, and the lower 35 mils of which is a good thermal insulator or barrier. The Rotoformer machine includes drying rolls and a calendering section which converts the polyvinyl alcohol fibers into a binder for the felted fibers. No distinct interface is positioned between the electrically conductive portion and the nonconductive portion of the paper.

EXAMPLE VI

A bilayered paper like that produced in Example V is provided with a foamed plastisol layer over the top of the electrically conductive surface of the paper in order to provide a durable washable surface. The plastisol is a predominantly open-celled polyvinyl chloride.

EXAMPLE VII

A rippled surface bilayered paper like that of Example V is prepared excepting that the pH of the first slurry is raised to 6 before adding to the lower stock pond. The all-glass layer deposits in ripples. A PVC1 plastisol is applied over the ripples and forms an irregular, pleasing plastisol surface.

EXAMPLE VIII

A heating system for a dwelling is made utilizing the paper of Example VI. Any of the papers produced in the above Examples can be used, but the material of Example VI is preferred since its surface is washable, paintable, and durable. The paper is applied to the surface of a room to be heated (preferably an outside wall) in much the same manner as wallpaper is hung on walls. A paste or adhesive is applied to the nonconductive surface of the paper, and one end of the paper is tacked to the wall adjacent the ceiling to hold the top end of the paper in place. Thereafter the paper is adjusted so that its side edges are vertical and overlapped and a vertical cut is made through the overlapped portions to give a tightly butted joint. This cutting does not affect the electrical continuity in any way inasmuch as electrical conductivity will occur across such a butt joint. The paper is then brushed into firm contact with the wall. All moldings adjacent the ceiling and the floor are removed from the wall prior to application of the paper and the bottom end of the paper is cut off beneath the area covered by the bottom molding. The process is repeated using butt joints until the entire wall surface to be heated is covered. Thereafter the top edge of the paper panel is delaminated by pulling back the plastisol layer to expose the electrically conductive layer of the heating panel. A bare copper wire is placed between the peeled-back portion of the plastisol layer and the conductive fibers, the plastisol layer is put back into position over the electrically conductive fibers with the copper wire wedged therebetween, and the top molding board is nailed in place, care being taken that the nails do not sever the copper wire or come in contact with any electrically conductive metal structure. The end of the copper wire is then connected to a step-down transformer supplying 10 volt alternating current through a relay, the control circuit of which is turned on and off by the usual room thermostat of a heating system.

The bottom edge of the paper forming the electrically conductive panel is also delaminated by peeling back the plastisol layer to expose the electrically conductive fiber layer. A bare copper wire is then wedged between the peeled-back plastisol layer and the electrically conductive fiber layer. The bottom molding is then positioned over the bottom copper wire, and is nailed in place to secure the wire and provide the ground terminal for the panel. The bottom copper wire is then connected to the ground wire for the power supply of the dwelling.

It will be seen that the heating panel is devoid of metal wires which, when ruptured, break the circuit and that the 10 volt terminals of the panel are so far separated and that the current is so uniformly distributed that dangerous shocks will not be experienced even when the plastisol layer is penetrated. It will furter be seen that the plastisol layer can be decorated as the wallpaper is decorated, that is, it can be either a solid color or can be printed with a pattern. The plastisol layer is not necessary in every instance since paint can be applied over the top of the electrically conductive surface of the paper by spraying, rolling, or brushing. In addition, the plastisol layer can be painted when it is desired to change the decor of the room containing the heating panel. It will be seen that the heating panel is inexpensive and can be put over a large area. As a result, heat loss from the room can be quite low provided that suitable insulation is provided on the backside of the paper. Glass fiber paper is an excellent insulation material and a nonconductive layer of glass fibers on the backside of the conductive layer is an ample insulator.

The following example illustrates the preparation of a plastisol suitable for use in this invention.

EXAMPLE IX

A plastisol is made from the following materials:

|  | Parts by weight |
|---|---|
| Polyvinyl chloride resin (solids) | 8,000 |
| $Sb_2O_3$ fire retardant | 400 |
| Talc filler | 640 |
| Dioctylphthalate plasticizer | 5,200 |
| Epoxy resin | 400 |
| Blowing agent (Azo-bisformamide) | 200 |
| Lead phosphite (activator) and stabilizer for the plastisol | 400 |
| Cell stabilizer (Ethoxylated derivative of acetylenic glycols) | 80 |
| Acrylic resin (ethyl methacrylate) | 320 |
| Diluent-Napthol spirits | 250 |
| Pigment-orange | 700 |
| Pigment-brown | 13.4 |

The foamable mixture was produced by adding the pigments and plasticizer to a Hobart Mixer. The fillers and fire retardants were mixed with part of the plasticizer in a small mixer to a uniform blend, and this uniform blend was then added to the Hobart Mixer. Thereafter, the powdered polyvinyl chloride resin was added to the Hobart Mixer and blended until homogeneous. The temperature of the mixture was maintained at a temperature less than 90° F. by the addition of a small amount of a diluent. Thereafter, more of the diluent was added and mixed until the mixture was homogeneous, following which the acrylic resin, stabilizers, and remaining materials including the remainder of the diluent were added. The plastisol was stored at 180° F. for a day before application to the glass felt. The felt was coated by adjusting a doctor blade over the surface of a roll around which the felt was passed. The doctor blade was set at a spacing from the roll of 100 mils. One end of the felt was passed through the space between the roll and doctor blade. The plasticizer was added on the backside of the doctor blade, and the felt was pulled therethrough. Following application of the plastisol by the doctor blade, the felt was passed through an oven at a temperature of 375° F. The plastisol was foamed in place and cured to provide a composite having a weight raio of glass felt to plastisol of 70/30. The coated felt so produced was extremely durable, and samples can be placed beneath carpeting and walked upon without damage to the felt.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates and which fall within the purview of the following claims.

What is claimed is:

1. A method for making a heating system for a dwelling having a wall surface facing a room to be heated comprising:
    a. adhering a bi-layered sheet of glass fiber felted paper to said wall surface, said sheet having a front electrically conductive layer of glass fibers having electrically conductive fibers dispersed in contact relationship throughout and an electrically non-conductive back layer of glass fibers;
    b. fixing a first electrical conductor on the front surface of said sheet;
    c. fixing a second electrical conductor on the front surface of said sheet in spaced relationship to said first electrical conductor; and,
    d. connecting different polarities of a power supply to said conductors.

* * * * *